US007615091B2

(12) United States Patent
Gieseke et al.

(10) Patent No.: US 7,615,091 B2
(45) Date of Patent: *Nov. 10, 2009

(54) FILTER ELEMENT, AIR CLEANER, AND METHODS

(75) Inventors: Steven Scott Gieseke, Richfield, MN (US); William M. Juliar, Coon Rapids, MN (US); Edward A. Steinbrueck, Eden Prairie, MN (US); Wayne R. W. Bishop, St. Louis Park, MN (US); Patrick Golden, Roseville, MN (US); Wayne C. Musselman, Big Lake, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 87 days.

This patent is subject to a terminal disclaimer.

(21) Appl. No.: 11/799,093

(22) Filed: Apr. 30, 2007

(65) Prior Publication Data

US 2007/0199285 A1 Aug. 30, 2007

Related U.S. Application Data

(63) Continuation of application No. 11/275,873, filed on Feb. 1, 2006, now Pat. No. 7,211,124, which is a continuation of application No. 10/863,626, filed on Jun. 7, 2004, now Pat. No. 7,001,450, which is a continuation of application No. 10/349,405, filed on Jan. 21, 2003, now Pat. No. 6,746,518, which is a continuation of application No. 10/077,526, filed on Feb. 15, 2002, now Pat. No. 6,547,857, which is a continuation of application No. 09/434,523, filed on Nov. 5, 1999, now Pat. No. 6,348,084.

(51) Int. Cl.
*B01D 46/42* (2006.01)
*B01D 46/52* (2006.01)
*B01D 46/24* (2006.01)

(52) U.S. Cl. .............................. 55/497; 55/498; 55/499; 55/500; 55/501; 55/502; 55/337; 55/520; 55/521; 55/DIG. 12; 95/267; 95/268; 95/269; 95/270; 95/271; 95/272; 95/273; 210/446; 210/450; 210/493.1; 210/493.4; 210/493.5

(58) Field of Classification Search ........... 55/497–502, 55/337, 520–521, DIG. 12 I; 95/267–273; 210/446, 450, 493.1, 493.4, 493.5
See application file for complete search history.

(56) References Cited

U.S. PATENT DOCUMENTS 1,238,068 A 8/1917 Slater et al.

(Continued)

FOREIGN PATENT DOCUMENTS

DE 962 066 4/1957

(Continued)

OTHER PUBLICATIONS

Translated contentions filed in European Opposition No. 00913578 by Mann & Hummel opposing Donaldson European Appl. 1 169 109, submitted Jan. 13, 2005.

(Continued)

*Primary Examiner*—Duane Smith
*Assistant Examiner*—Minh-Chau T Pham
(74) *Attorney, Agent, or Firm*—Merchant & Gould, P.A.

(57) ABSTRACT

A filter arrangement includes a filter element, a frame construction secured to the filter element, and a handle member secured to the filter element. In preferred embodiments, the handle member is secured to the frame construction. Preferably, the filter element includes a central core member, wherein fluted filter media is coiled around the central core member. Preferably, the central core member includes a plurality of corrugations, wherein the corrugations mateably engage at least some flutes. Preferably, the handle member is integral with the central core member, and also includes a fastening member for connection to a frame construction on the filter element. Methods for cleaning air and servicing an air cleaner preferably include constructions as described herein.

10 Claims, 9 Drawing Sheets

U.S. PATENT DOCUMENTS

| | | |
|---|---|---|
| 2,064,207 A | 12/1936 | Jacobs |
| 2,599,604 A | 6/1952 | Bauer et al. |
| 2,887,177 A | 5/1959 | Mund et al. |
| 2,890,796 A | 6/1959 | Blood |
| 3,025,963 A | 3/1962 | Bauer |
| 3,209,917 A | 10/1965 | Yelinek |
| 3,520,417 A | 7/1970 | Durr et al. |
| 3,676,242 A | 7/1972 | Prentice |
| 3,695,437 A | 10/1972 | Shaltis |
| 3,807,150 A | 4/1974 | Maracle |
| 3,841,953 A | 10/1974 | Lohkamp et al. |
| 3,849,241 A | 11/1974 | Butin et al. |
| 3,878,014 A | 4/1975 | Melead |
| 3,912,631 A | 10/1975 | Turman |
| 3,996,914 A | 12/1976 | Crall et al. |
| 4,065,341 A | 12/1977 | Cub |
| 4,093,435 A | 6/1978 | Marron et al. |
| 4,158,449 A | 6/1979 | Sun et al. |
| 4,159,899 A | 7/1979 | Deschenes |
| 4,162,906 A | 7/1979 | Sullivan et al. |
| 4,201,819 A | 5/1980 | Schenz |
| 4,247,316 A | 1/1981 | Putman |
| 4,255,175 A | 3/1981 | Wilkins |
| 4,316,801 A | 2/1982 | Cooper |
| 4,322,231 A | 3/1982 | Hilzendeger et al. |
| 4,394,147 A | 7/1983 | Caddy et al. |
| 4,402,830 A | 9/1983 | Pall |
| 4,410,430 A | 10/1983 | Hagler, Jr. |
| 4,430,223 A | 2/1984 | Miyakawa et al. |
| 4,449,993 A | 5/1984 | Bergeron |
| 4,537,608 A | 8/1985 | Koslow |
| 4,575,422 A | 3/1986 | Zimmer |
| 4,589,983 A | 5/1986 | Wydevan |
| 4,810,379 A | 3/1989 | Barrington |
| 4,997,466 A | 3/1991 | Hood |
| 5,069,790 A | 12/1991 | Mordeki |
| 5,211,846 A | 5/1993 | Kott et al. |
| 5,290,621 A | 3/1994 | Bach et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,443,891 A | 8/1995 | Bach |
| 5,472,463 A | 12/1995 | Herman et al. |
| 5,487,767 A | 1/1996 | Brown |
| 5,531,892 A | 7/1996 | Duffy |
| 5,536,290 A | 7/1996 | Stark et al. |
| 5,543,007 A | 8/1996 | Takagaki et al. |
| 5,547,480 A | 8/1996 | Coulonvaux |
| 5,601,717 A | 2/1997 | Villette et al. |
| 5,613,992 A | 3/1997 | Engel |
| 5,624,559 A | 4/1997 | Levin et al. |
| 5,714,126 A | 2/1998 | Frund |
| 5,730,766 A | 3/1998 | Clements |
| 5,820,646 A | 10/1998 | Gillingham et al. |
| 5,846,495 A | 12/1998 | Whittenberger et al. |
| 5,895,574 A | 4/1999 | Friedmann et al. |
| 5,897,676 A | 4/1999 | Engel et al. |
| 5,897,787 A | 4/1999 | Keller |
| D417,268 S | 11/1999 | Gillingham |
| 6,017,379 A | 1/2000 | Kauffman |
| 6,179,890 B1 | 1/2001 | Ramos et al. |
| D437,402 S | 2/2001 | Gieseke et al. |
| 6,235,195 B1 | 5/2001 | Tokar |
| D444,219 S | 6/2001 | Gieseke et al. |
| 6,348,084 B1* | 2/2002 | Gieseke et al. ............ 95/273 |
| 6,350,291 B1 | 2/2002 | Gieseke et al. |
| 6,547,857 B2* | 4/2003 | Gieseke et al. ............ 95/273 |
| 6,746,518 B2* | 6/2004 | Gieseke et al. ............ 95/273 |
| 7,001,450 B2 | 2/2006 | Gieseke et al. |
| 7,008,467 B2* | 3/2006 | Krisko et al. ............ 95/268 |
| 2002/0185007 A1 | 12/2002 | Xu et al. |
| 2003/0106432 A1* | 6/2003 | Gieseke et al. ............ 95/273 |
| 2005/0005767 A1* | 1/2005 | Gieseke et al. ............ 95/273 |
| 2005/0229561 A1* | 10/2005 | Nepsund et al. ............ 55/481 |
| 2006/0101998 A1* | 5/2006 | Gieseke et al. ............ 95/273 |
| 2006/0123754 A1* | 6/2006 | Oelpke et al. ............ 55/498 |
| 2007/0271886 A1* | 11/2007 | Rieger et al. ............ 55/486 |
| 2008/0110142 A1* | 5/2008 | Nelson et al. ............ 55/357 |

FOREIGN PATENT DOCUMENTS

| | | |
|---|---|---|
| DE | 3405719 A1 | 8/1985 |
| DE | 44 29 527 A1 | 10/1995 |
| DE | 44 15 890 A1 | 11/1995 |
| EP | 1 169 109 B1 | 4/2004 |
| FR | 2 382 258 | 9/1978 |
| FR | 2 766 383 A1 | 1/1999 |
| GB | 945 065 | 12/1963 |
| GB | 1 284 403 | 8/1972 |
| JP | 54-108481 | 7/1979 |
| JP | 59-170669 | 11/1984 |
| JP | 60-112320 | 7/1985 |
| JP | 60-155921 | 10/1985 |
| JP | 63-31691 | 8/1988 |
| JP | 63-33612 | 9/1988 |
| JP | 1-11971 | 4/1989 |
| JP | 1-171615 | 7/1989 |
| JP | 2-9858 | 3/1990 |
| JP | 2-31131 | 8/1990 |
| JP | 2-129233 | 10/1990 |
| JP | 3-32923 | 3/1991 |
| JP | 6-1213 | 1/1994 |
| JP | 7-28891 | 7/1995 |
| WO | WO 97/40917 | 11/1997 |
| WO | WO 00/50153 | 8/2000 |

OTHER PUBLICATIONS

Complaint with Exhibits A-F; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

Notice Of Claims Involving Patents; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

Rule 7.1 Disclosure Statement of Plaintiff Donaldson Company, Inc.; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

Civil Cover Sheet; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

* cited by examiner

FILTER ELEMENT, AIR CLEANER, AND METHODS

This application is a continuation of Ser. No. 11/275,873, filed Feb. 1, 2006, issued as U.S. Pat. No. 7,211,124, which is a continuation of application Ser. No. 10/863,626, filed Jun. 7, 2004, issued as U.S. Pat. No. 7,001,450, which is a continuation of application Ser. No. 10/349,405, filed Jan. 21, 2003, issued as U.S. Pat. No. 6,746,518, which is a continuation of application Ser. No. 10/077,526, filed Feb. 15, 2002, issued as U.S. Pat. No. 6,547,857 which is a continuation of application Ser. No. 09/434,523, filed Nov. 5, 1999, issued as U.S. Pat. No. 6,348,084. The disclosures of all of these are incorporated herein by reference.

TECHNICAL FIELD

This disclosure describes filter constructions for filtering fluids, such as gas or liquid. In particular, this disclosure describes a filter element having a centerpiece, methods for servicing an air cleaner, and methods for constructing a filter element having a centerpiece.

BACKGROUND

Straight through flow filter elements have been used in systems for cleaning fluid passing therethrough. Straight through flow filter elements typically will have an inlet face and an oppositely disposed outlet face. In this manner, fluid flows in one certain direction upon entering the filter element at the inlet face and will have the same direction of flow as it exits the outlet face. Typically, straight through flow filter elements will be installed in a duct or housing of some type. After a period of use, the filter element will require servicing, either cleaning or a complete replacement. If it is difficult or inconvenient to service the filter element, the user may delay the proper servicing, which can cause damage to whatever system is being filtered.

Improvements to straight through flow filter elements are desirable.

SUMMARY OF THE DISCLOSURE

The disclosure describes a filter arrangement including a filter element, a frame construction secured to the filter element, and a handle member secured to the filter element. In preferred arrangements, the filter element includes a plurality of flutes, wherein each of the flutes have a first end portion adjacent to a first end of the filter element, and a second end portion adjacent to a second end of the filter element. Selected ones of the flutes are open at the first end portion and closed at the second end portion, while selected ones of the flutes are closed at the first end portion and open at the second end portion.

In preferred arrangements, the handle member is secured to the frame construction.

In certain preferred embodiments, the filter element includes a central core member, wherein the plurality of flutes are coiled around the central core member. Preferably, the handle member will be secured to the central core member. In preferred embodiments, the central core member includes a plurality of corrugations, wherein the corrugations mateably engage at least some of the flutes.

The disclosure also describes a center board for use in a filter element. Preferred center boards include an extension having first and second opposite ends, and a region of corrugation located on the extension between the first and second ends. The region of corrugation is constructed and arranged to mate with fluted media of a filter element.

Preferably, the center board will include a handle member forming the first end, and a fastening member forming the second end. The fastening member is preferably constructed and arranged to connect to a frame construction of the filter element.

The disclosure also describes an air cleaner including a housing and a filter element removably positioned in the housing. The housing includes a body member and a cover. The cover includes a projection extending in a direction toward an interior of the body member. The filter element preferably includes a center board extending at least partially into the filter element. Preferably, the center board includes a first portion axially extending from a flowface of the filter element. In preferred embodiments, the projection of the cover will engage the first portion of the center board, when the filter element is operably installed in the interior, and when the cover is operably oriented over an open end of the body member.

The disclosure also describes a method for servicing an air cleaner. The method includes providing a filter element installed in a housing. The filter element includes a frame construction secured thereto. The method includes a step of grasping a handle secured to the frame construction, and pulling the handle to remove the filter element from the housing. Preferred methods will utilize filter element constructions as characterized herein.

Methods for constructing air filter elements are also described. In preferred methods, there is a step of providing a center board having first and second opposite ends and a region of corrugation at least partially located between the first and second ends. Selected flutes of fluted filter media are aligned with the region of corrugation. The fluted filter media is then wound around the center board.

DETAILED DESCRIPTION

Figure 1:
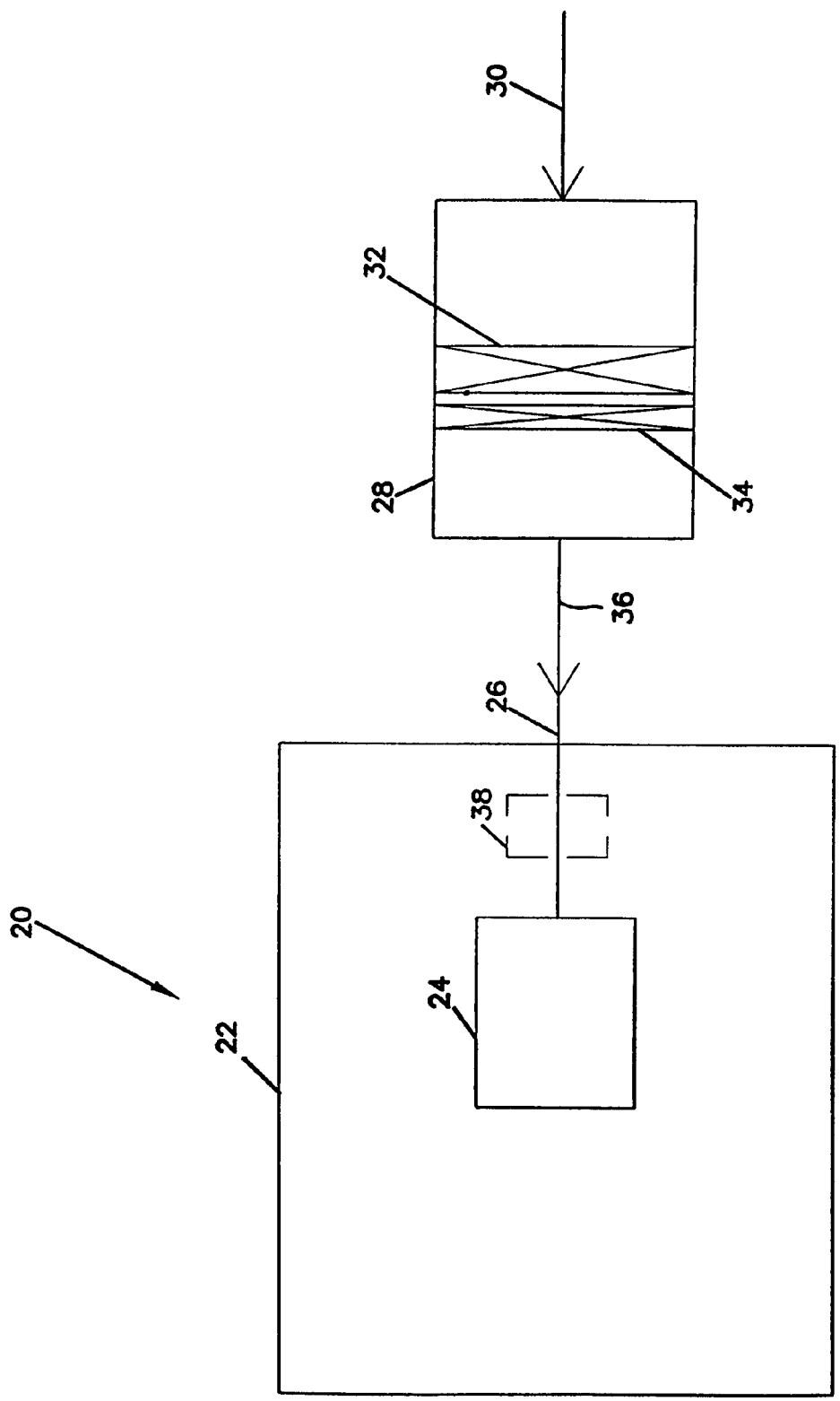
FIG. 1 is a schematic view of one embodiment of a system having an engine with an air intake system and an air cleaner constructed according to principles disclosed herein.

A. FIG. 1, System of Use

The air cleaner arrangements and constructions disclosed herein are usable in a variety of systems. FIG. 1 depicts one particular system, shown schematically at 20. In FIG. 1, equipment 22, such as a vehicle, having an engine 24 with some defined rated airflow demand, for example, about 500-700 CFM, is shown schematically. Equipment 22 may comprise a bus, a highway truck, an off-road vehicle, a tractor, or marine application such as a powerboat. Engine 24 powers equipment 22, through the use of an air, fuel mixture.

In FIG. 1, airflow is shown drawn into the engine 24 through an air intake system 26. The air intake system 26 includes an air cleaner 28, and air is taken into the air cleaner 28 at arrow 30.

A primary filter element 32 is shown upstream of the engine 24 to remove particles and contaminants from the air. Downstream of the primary filter element 32 may be an optional safety element 34. The safety element 34 is also upstream of the engine 24 to remove any particles and contaminants that did not get removed by the primary element 32.

The air is cleaned in the air cleaner 28, and then it flows downstream at arrow 36 into the intake 26. From there, the air flows into the engine 24 to power the equipment 22. An optional turbo 38 may be used to boost the power.

B. Overview of Air Cleaner

Figure 2:
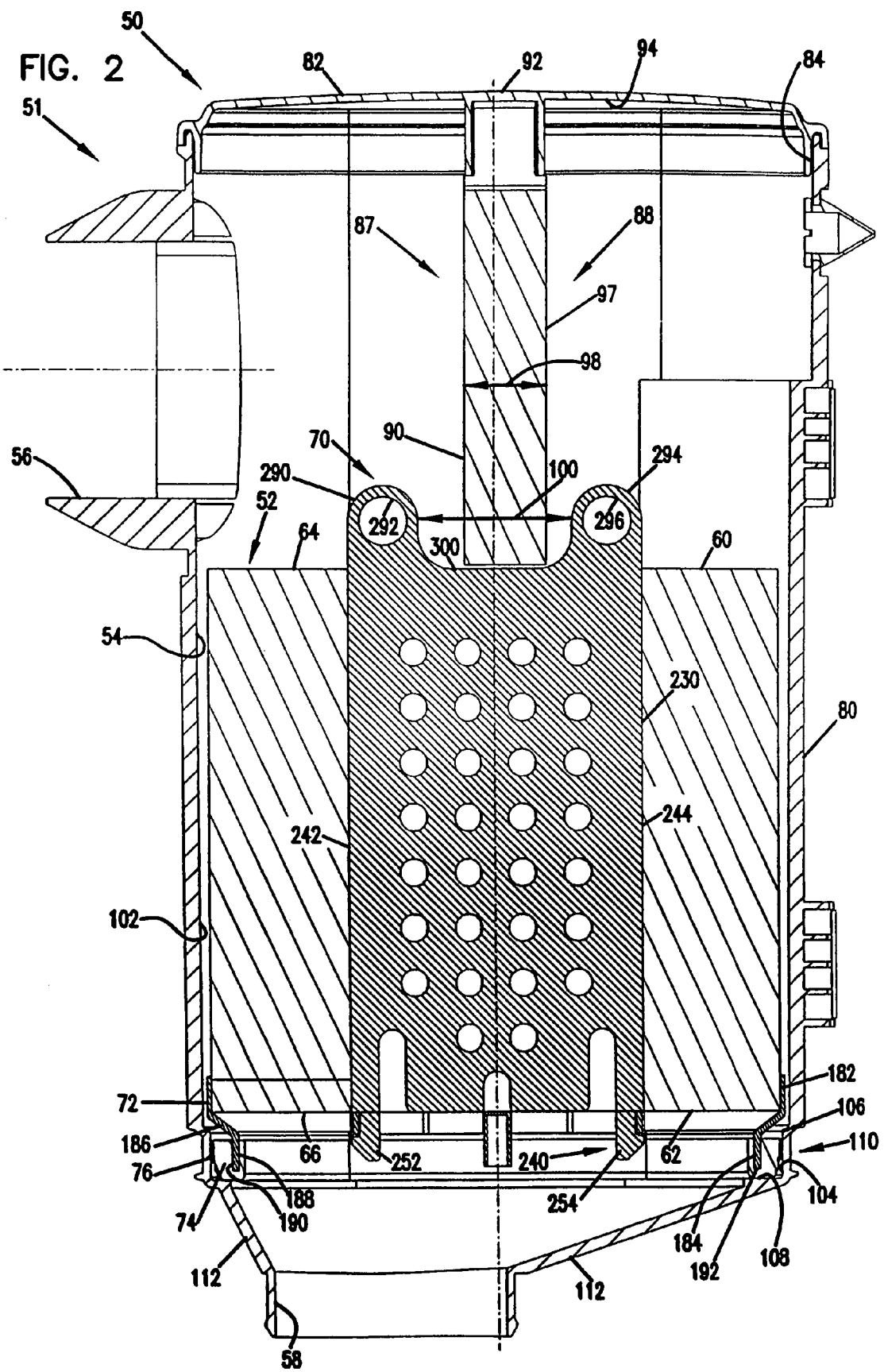
FIG. 2 is a schematic, cross-sectional view of one embodiment of an air cleaner, including an air cleaner housing and a filter element operably installed therein, constructed according to principles of this disclosure.

One example of an air cleaner 28 usable in system 20 is shown in cross-section in FIG. 2 at 50. In general, the air cleaner 50 holds a removable and replaceable filter element 52 within its interior 54. The air cleaner 52 includes an inlet 56 and an outlet 58. Air to be cleaned is directed into the air cleaner 50 through the inlet 56, through the filter element 52, and then out through the outlet 58. The air will typically then be directed into an air intake system, such as intake 28 for engine 24. The filter element 52, when operably installed in the housing 51, will remove substantial portions of particulate matter from the air or gas flow stream directed therethrough.

Still in reference to FIG. 2, the filter element 52 is configured to permit straight through flow. By the term "straight through flow," it is meant that the fluid flows directly through the filter element 52, entering at an inlet face 60 and exiting at an oppositely disposed outlet face 62, wherein the direction of fluid flow entering the inlet face 60 is in the same direction of fluid flow exiting the outlet face 62. For example, the filter element 52 has a first end 64 and an opposite, second end 66. In the arrangement depicted in FIG. 2, the first end 64 will correspond to an upstream end inlet face 60, while the second end 66 will correspond to a downstream end outlet face 62. Other arrangements may include the first end 64 as corresponding to the outlet face, while the second end 66 corresponds to the inlet face. The straight through flow allows gas to flow into the first end 64 and exit the second end 66, such that the direction of the air flow into the first end 64 is the same direction of air flow that is exiting the second end 66. Straight through flow patterns can reduce the amount of turbulence in the gas flow.

Still in reference to FIG. 2, there is also a handle member 70 secured to the filter element 52, to assist in servicing the air cleaner 50. In particular, the handle member 70 assists in the convenient removal of the filter element 52, to service the air cleaner 50. The handle member 70 is described in further detail below. FIG. 2 also illustrates a frame construction 72 secured to the filter element 52. As will be described in further detail below, the frame construction 72, in preferred embodiments, supports a seal member 74 to create a seal, preferably a radial seal 76, between the filter element 52 and the housing 51. The frame construction 72 also, in preferred embodiments, engages the handle member 70. This is discussed further below.

C. The Housing

Figure 3:
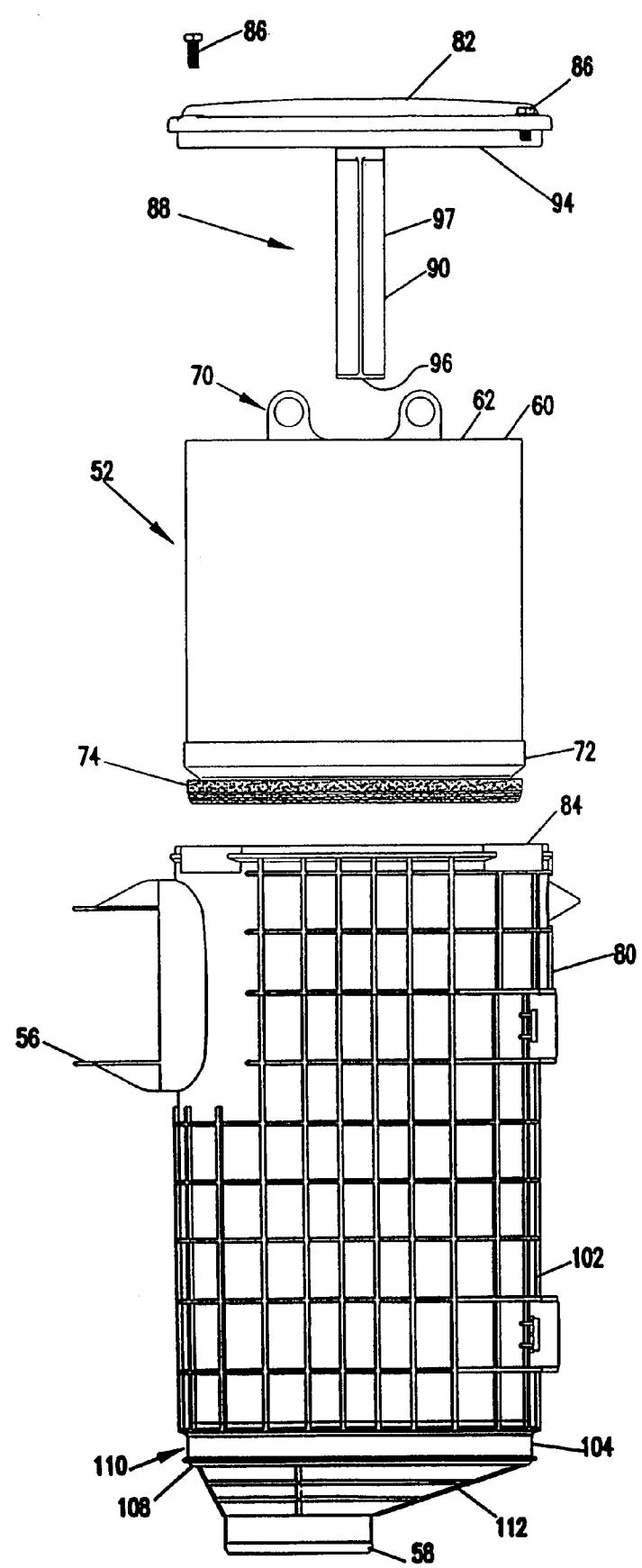
FIG. 3 is a schematic, exploded, side elevational view of the air cleaner depicted in FIG. 2.

Attention is directed to FIGS. 2 and 3. The housing 51 preferably includes two pieces, a body member 80 and a removable cover 82. Body member 80 defines the open interior 54 (FIG. 2) and an open end 84. The open end 84 is for receiving the filter element 52 therethrough. The cover 82 is selectively movable from the open end 84 of the body member 80, in order to provide access to the interior 54. For example, during servicing of the air cleaner 50, the cover 82 can be removed to provide access to the filter element 52.

The cover 82 includes fasteners, such as bolts 86 (FIG. 3) for securing the cover 82 to the body member 80.

In general, the air cleaner 50 includes a stay member 87 that will help to keep the filter element 52 properly oriented in the body member 80. The stay member 87 will also function as an indicator to communicate to the user if the user has not initially properly installed the filter element 52 in the body member 80. By "properly installed," it is meant that the filter element 52 is oriented and seated within the interior 54, and the radial seal 76 is in place.

While a variety of embodiments for the stay member 87 are contemplated, in the particular embodiment illustrated, the stay member 87 comprises a projection 88 extending from the cover 82 in a direction toward the interior 54, when the cover 82 is operably oriented over the open end 84 of the body member 80. The projection 88 helps to hold the filter element 52 in place within the body member 80, during operation. Vibration and other factors could try to knock the filter element 52 loose within the housing 51 during operation. The projection 88 helps to keep the filter element 52 properly seated and installed.

In the embodiment illustrated in FIG. 3, the projection 88 includes an elongate extension 90, extending from and integral with the cover 82. In particular, the extension 90 is located at about the center 92 (FIG. 2) of the cover 82. The extension 90 is preferably angled between about 80-100°, preferably about 90°, relative to the inside surface 94 of the cover 82. The extension 90 includes a generally flat, element engaging end 96. As such, the extension 90 comprises a cantilevered beam 97 with a fixed end at the cover 82 and a free end at the element engaging end 96. Preferably, the extension 90 will have a width 98 (FIG. 2) that is smaller than a void 100 (FIG. 2) formed in the handle member 70.

In reference again to FIG. 2, the body member 80 has in its interior 54 a first annular region 102 and a second annular region 104. The second annular region 104 is smaller or reduced relative to the first annular region 102. This creates a shoulder 106 at the transition between these two regions. There is also an end wall 108 terminating the second annular region 104. The second annular region 104, together with the end wall 108, forms a seat 110 for receiving the frame construction 72 with the seal member 74. The filter element 52 is properly oriented in the housing 51, when the seal member 74 is compressed against the second annular region 104 to form radial seal 76 against the second annular region 104. The end wall 108 helps to orient the filter element 52, and prevent it from being pushed downstream, past the second annular region 104.

It should be appreciated that the radial seal 76 helps to prevent unintended gas flow from flowing around the filter element 52 and avoiding the filtering affect of the filter element 52. That is, the radial seal 76 helps to force the gas flow coming through the inlet 56 to travel through the filter element 52, in order to reach the outlet 58.

The body member 80 also includes a sloped wall portion 112 extending from the end wall 108 toward the outlet 58. The sloped wall portion 112 helps to direct the filtered or cleaned gas from the outlet face 62 through the outlet 58.

D. The Filter Element

Figure 4:
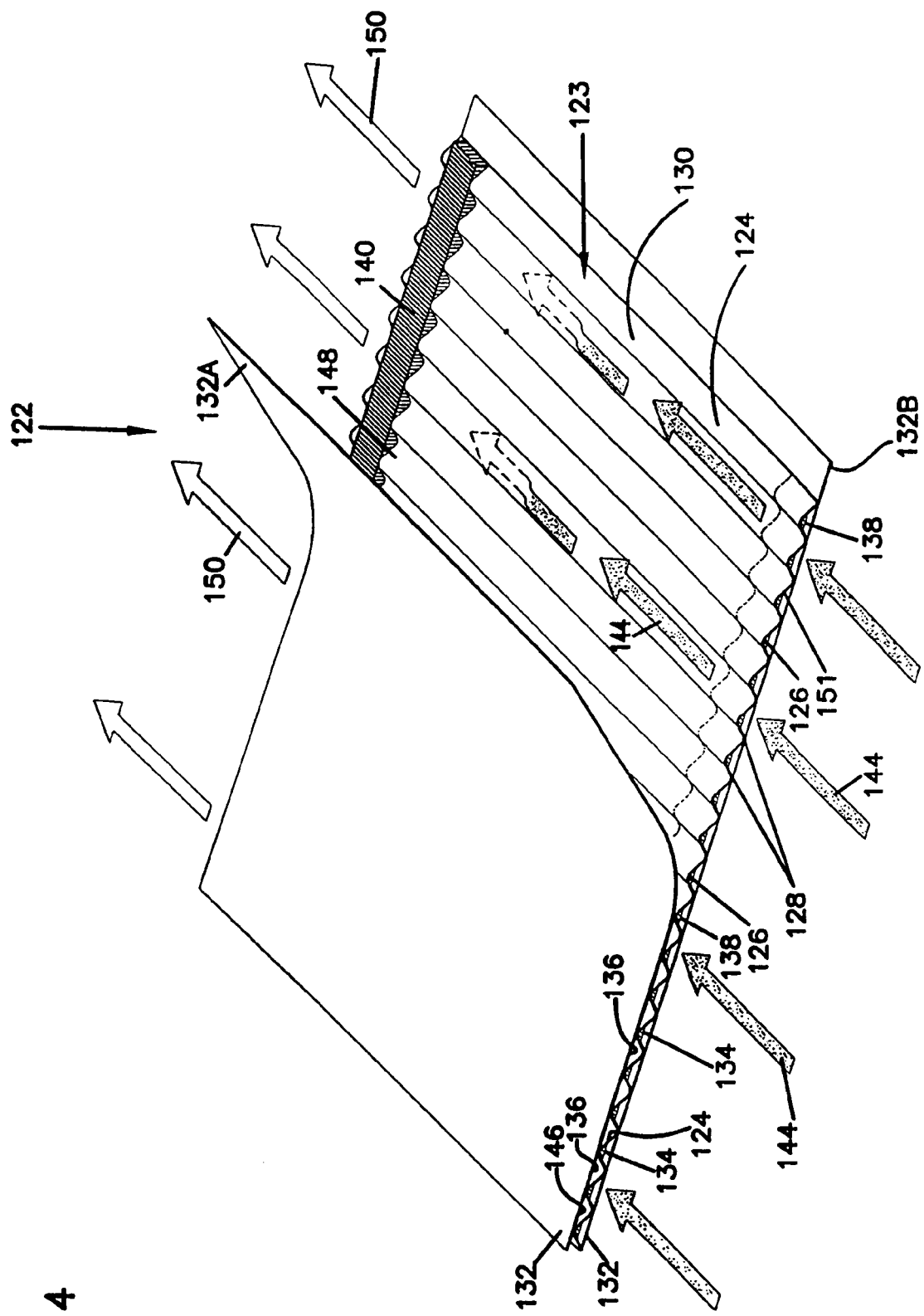
FIG. 4 is a schematic, perspective view of one embodiment of a portion of filter media usable in the filter element depicted in FIGS. 2 and 3.

The filter element 52 will now be described in further detail. Attention is directed to FIG. 4. FIG. 4 is a schematic, perspective view demonstrating the principles of operation of certain preferred media usable in the filter construction herein. In FIG. 4, a fluted construction is generally designated at 122. Preferably, the fluted construction 122 includes: a layer 123 of corrugations having a plurality of flutes 124 and a face sheet 132. The FIG. 4 embodiment shows two sections of the face sheet at 132A (depicted on top of the corrugated layer 123) and at 132B (depicted below the corrugated layer 123). Typically, the preferred fluted construction 122 will include the corrugated layer 123 secured to the bottom face sheet 132B. When using this fluted construction 122 in a rolled construction, it typically will be wound around itself, such that the bottom face sheet 132B will cover the top of the corrugated layer 123. The face sheet 132 covering the top of the corrugated layer 123 is depicted as 132A. It should be understood that the face sheet 132A and 132B are the same sheet 132.

When using this type of fluted construction 122, the flute chambers 124 preferably form alternating peaks 126 and troughs 128. The troughs 128 and peaks 126 divide the flutes into an upper row and a lower row. In the particular configuration shown in FIG. 4, the upper flutes form flute chambers 136 closed at the downstream end, while flute chambers 134 having their upstream end closed form the lower row of flutes. The fluted chambers 134 are closed by a first end bead 138 that fills a portion of the upstream end of the flute between the fluting sheet 130 and the second facing sheet 132B. Similarly, a second end bead 140 closes the downstream end of alternating flutes 136. In some systems, both the first end bead 138 and second end bead 140 are straight all along portions of the fluted construction 122, never deviating from a straight path.

When using media constructed in the form of fluted construction 122, during use, unfiltered fluid, such as air, enters the flute chambers 136 as indicated by the shaded arrows 144. The flute chambers 136 have their upstream ends 146 open. The unfiltered fluid flow is not permitted to pass through the downstream ends 148 of the flute chambers 136 because their downstream ends 148 are closed by the second end bead 140. Therefore, the fluid is forced to proceed through the fluting sheet 130 or face sheets 132. As the unfiltered fluid passes through the fluting sheet 130 or face sheets 132, the fluid is cleaned or filtered. The cleaned fluid is indicated by the unshaded arrow 150. The fluid then passes through the flute chambers 134, which have their upstream ends 151 closed to flow through the open downstream ends out the fluted construction 122. With the configuration shown, the unfiltered fluid can flow through the fluted sheet 130, the upper facing sheet 132A, or the lower facing sheet 132B and into a flute chamber 134.

Figure 5:
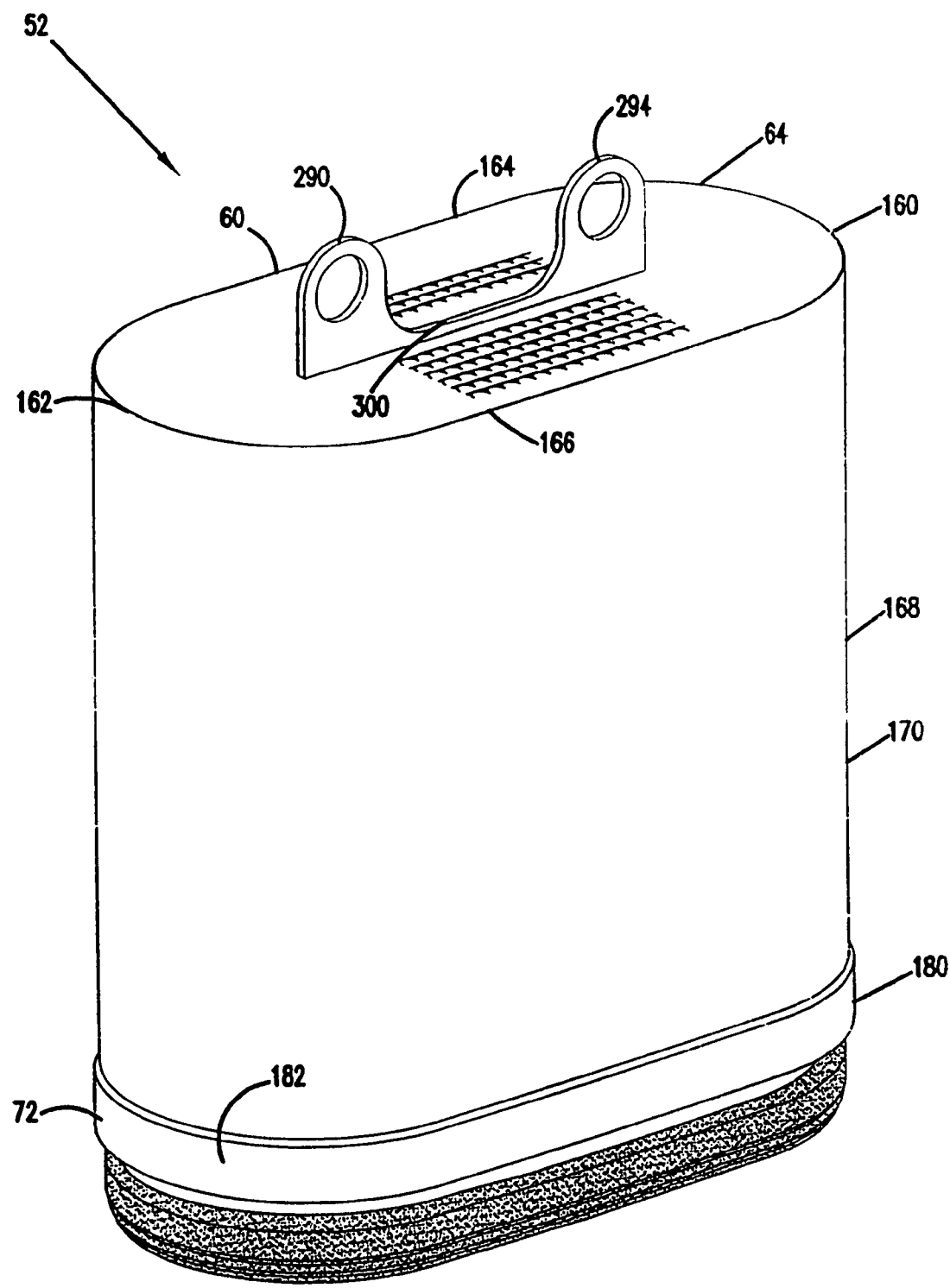
FIG. 5 is a schematic, perspective view of the embodiment of the air filter element depicted in FIGS. 2 and 3.

The fluted construction 122 is typically wound into a rolled or coiled form, such as shown in FIG. 5. A variety of ways can be used to coil or roll the fluted construction 122. In constructing the filter element 52, typically the fluted construction 122 is wound around the handle member 70 in a coil or spiral pattern thereabout. This is described in further detail below. Referring again to FIG. 5, note the cross-sectional shape of the filter element 52 is non-circular. While the cross-section could be circular, due to the geometry of the volume that the filter element 52 is installed within, it is sometimes convenient to have a non-circular cross-section. This cross-section permits a relatively large amount of media to economically occupy a small volume. In some preferred constructions, the cross-sectional configuration of the filter element 52 will be ob-round. In the particular embodiment shown in FIG. 5, the filter element 52 defines a cross-section that is racetrack shaped. By "racetrack shaped," it is meant that the filter element 52 defines a curved (in some embodiments, semicircular) end 160 and an opposite curved (in some embodiments, semicircular) end 162. The curved ends 160 and 162 are joined by a pair of straight segments 164, 166.

When using rolled constructions, such as the filter element 52, the system designer will want to ensure that the outer periphery of the filter element 52 is closed or locked in place to prevent the fluted media construction 122 from unwinding. There are a variety of ways to accomplish this. In some applications, the outer periphery 168 is wrapped with a periphery layer 170. The periphery layer 170 can be a non-porous material, such as plastic with an adhesive on one side. In some embodiments, the periphery layer 170 may be a tough, durable material such as chip board or mylar. Still in other embodiments, the outer layer 170 may be a permeable media.

In reference again to FIG. 2, the filter element 52 is shown installed in the housing 52. In the arrangement shown, air flows into the housing 51 through the inlet 56, through the filter element 52, and out of the housing 51 at the outlet 58. The seal member 74 is needed to ensure that air flows through the filter element 52, rather than bypass it.

E. The Frame Construction and Sealing System

The frame construction 72 provides a support structure or backing against which the seal member 74 can be compressed to form radial seal 76 with the body member 80 of the housing 51.

Figure 6:
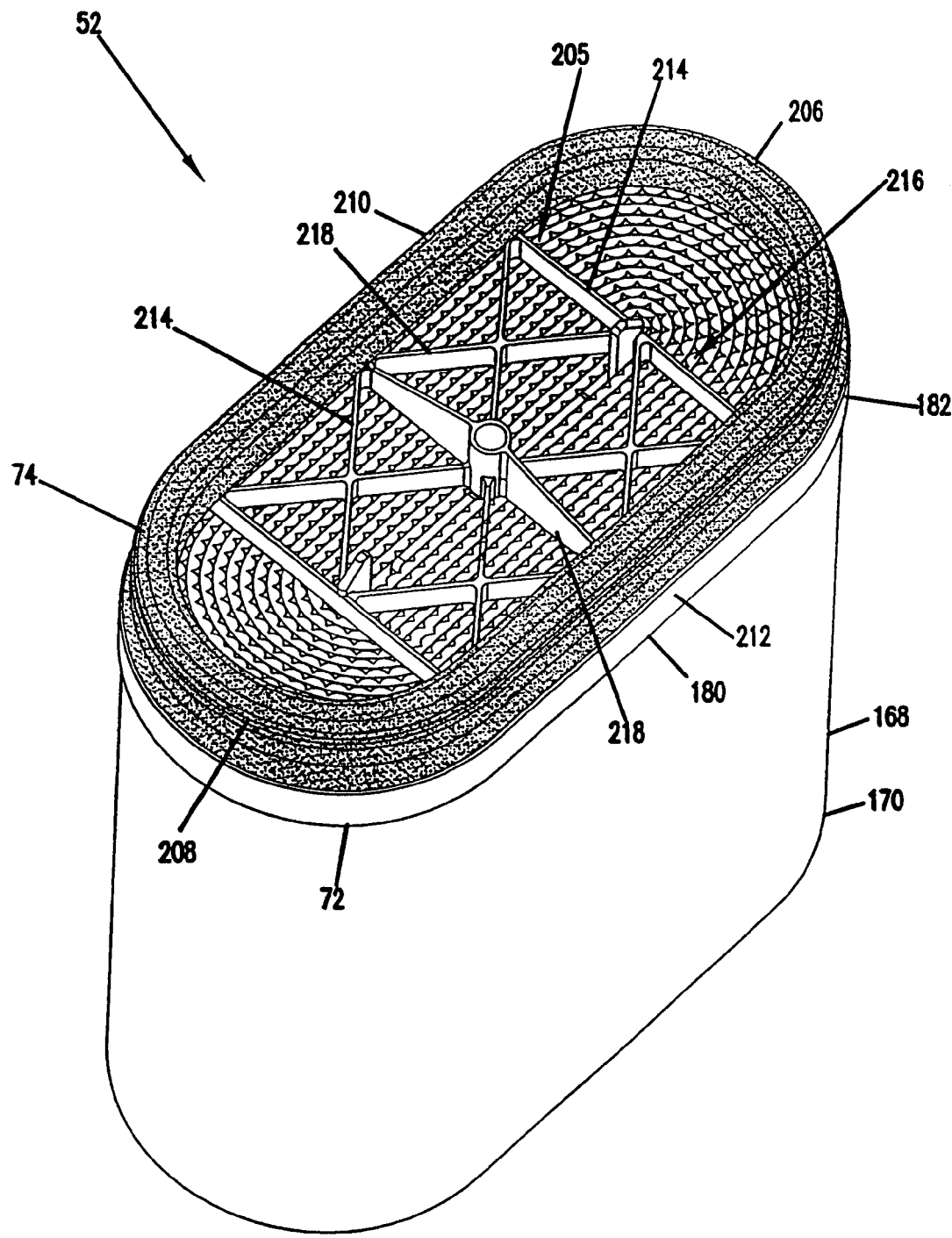
FIG. 6 is a schematic, perspective view of one embodiment of the filter element depicted in FIG. 5, and shown from an opposite end.
Figure 7:
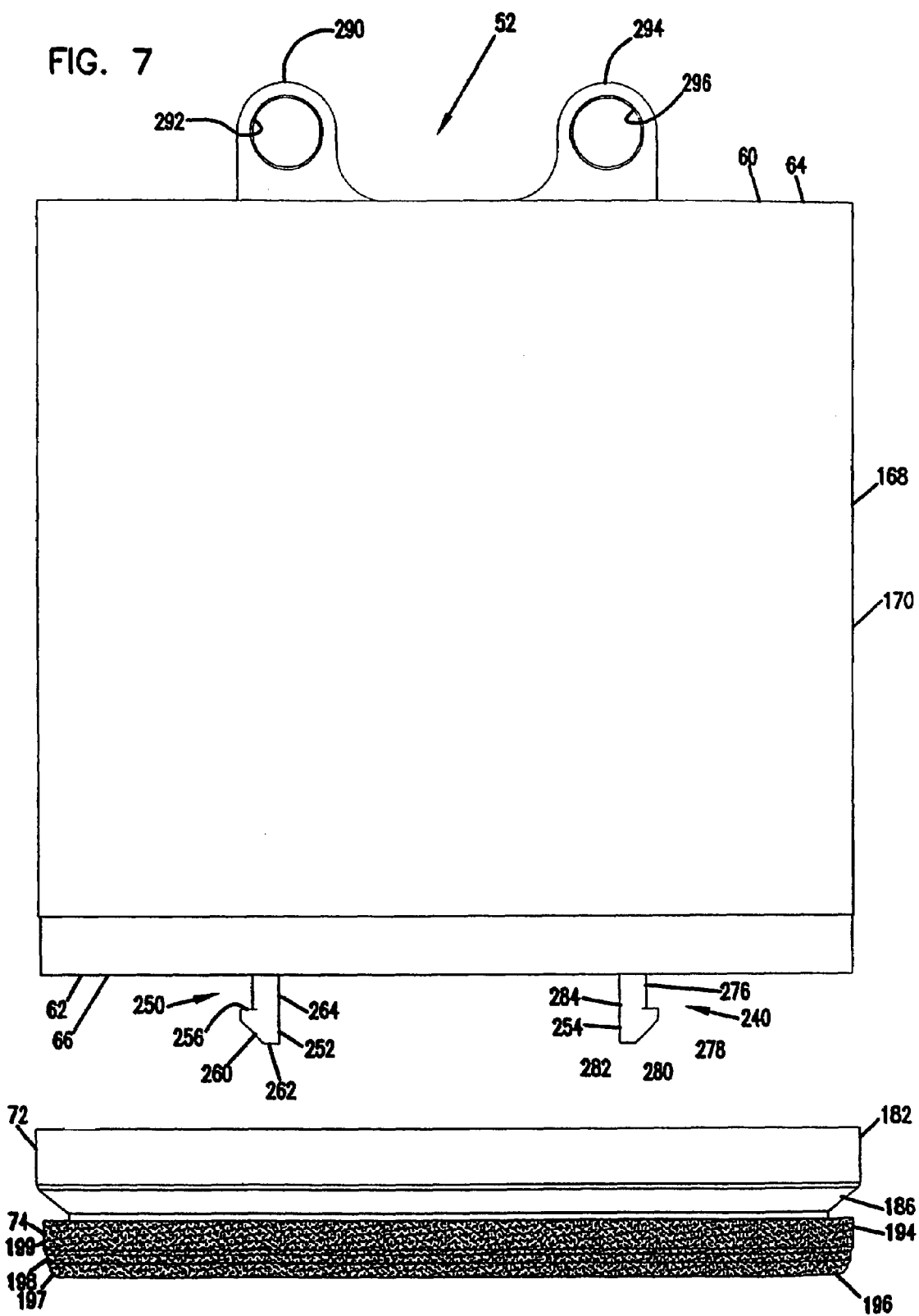
FIG. 7 is a schematic, exploded, side elevational view of one embodiment of the filter element depicted in FIGS. 5 and 6.

Attention is directed to FIGS. 5-7. The frame construction 72 includes a frame 180. The frame 180 may be a variety of shapes. In the particular embodiment illustrated in FIGS. 5-7, the shape of the frame 180 is generally ob-round or racetrack shaped. The frame 180 is convenient in that it is arranged and configured for attachment to the outlet face 62 of the filter element 52.

The preferred frame 180 depicted includes a band, skirt, or depending lip 182 that is generally sized to mateably engage and receive the second end 66 of the filter element 52. The depending lip 182 preferably extends radially around the outlet face 62, such that the depending lip 182 extends inboard a distance over the filter element 52. In preferred arrangements, the frame 180 will be secured to the filter element 52 at the interface between the lip 182 and the inboard region that the lip 182 extends along the periphery layer 170.

The frame 180 also includes an annular sealing support 184 (FIG. 2) extending from the lip 182. Between the sealing support 184 and the lip 182, the frame 180 includes a step 186. The step 186 provides a transition area between a larger dimension of the lip 182 and a reduced dimension of the sealing support 184.

When constructed according to principles described herein, the sealing support 184 provides a rigid support surface for the seal member 74. The seal member 74 is preferably constructed and arranged to be sufficiently compressible to be squeezed or compressed between the sealing support 184 of the frame 180 and the second annular region 104 of the body member 80. When compressed between the support surface 184 and the second annular region 104, the radial seal 76 is formed between the filter element 52 and the body member 80 of the housing 51.

A variety of ways are possible to secure the seal member 74 to the sealing support 184. One particularly convenient and preferred way is by molding the seal member 74 to engage, cover, or overlap both the inner portion 188 and the outer portion 190 of the sealing support 184, including the end tip 192. One example of this is depicted in FIG. 2. The seal member 74 completely covers the sealing support 184, by wrapping around the inner portion 188, the end tip 192, and the outer portion 190.

The sealing support 184 acts as a support structure between and against which the radial seal 76 may be formed by the compressible seal member 74. The compression of the compressible seal member 74 is preferably sufficient to form radial seal 76 under insertion pressures of no greater than 80 lbs., typically, no greater than 50 lbs., for example about 20-30 lbs., and light enough to permit convenient and easy change-out by hand. Preferably, the amount of compression of the seal member 74 is at least 15%, preferably no greater than 40%, and typically between 20 and 33%. By the term "amount of compression," it is meant the physical displacement of an outermost portion of the seal member 74 radially toward the sealing support 184 as a percentage of the outermost portion of the seal member 74 in a resting, undisturbed state and not installed within the housing 51 or subject to other forces.

Attention is directed to FIG. 7. Preferably, the seal member 74 has a stepped cross-sectional configuration of decreasing outermost dimensions from a first end 194 to a second end 196 to achieve desirable sealing. Preferably, the seal member 74 will comprise a polyurethane foam material having a plurality (preferably, at least three) of progressively larger steps configured to interface with the second annular region 104 (FIG. 2) and provide a fluid-tight seal. As can be seen in FIG. 7, the seal member 74 defines three steps 197, 198, and 199 that increase in dimension between the second end 196 and the first end 194. The smallest dimension at step 197 allows for easy insertion into the body member 80. The largest dimension at step 199 ensures a tight radial seal 76.

In general, for a properly functioning radially sealing structure, the compressible seal member 74 needs to be compressed when the element 52 is mounted in the housing 51 (FIG. 2). In many preferred constructions, the seal member 74 is compressed between about 15% and 40% (often, about 20-33%) of its thickness to provide for a strong robust seal, yet still be one that can result from hand installation of the element 52 with forces on the order of 80 lbs. or less, preferably 50 lbs. or less, and generally about 20-30 lbs.

Attention is directed to FIG. 6. The preferred frame 180 includes a support system 205. During use of the filter element 52 depicted, inward forces are exerted around the outer periphery of the frame 180. Inward forces exerted against the curved ends 206, 208 can cause the straight segments 210, 212 to bow or bend. The support system 205 is provided as part of the frame 180 to prevent the straight segments 210, 212 from bowing. Further, the support system 205 also provides for engagement and connection with the handle member 70.

While a variety of structures are contemplated herein, in the particular embodiment illustrated in FIG. 6, the support system 205 includes a plurality of cross braces 214 to provide structural rigidity and support to the straight segments 210, 212. As can be seen in FIG. 6, the cross braces 214 form a truss system 216 between the opposing straight segments 210, 212. The truss system 216 includes a plurality of rigid members or struts 218, preferably molded as a single piece with the remaining portions of the frame 180.

As can also be seen in FIG. 6, the support system 205 provides engagement surfaces or members for the handle member 70 to connect with. This is described further below.

F. Handle Member

The handle member 70 is now described in further detail. Preferably, the handle member 70 is secured to the filter element 52, and is constructed and arranged to accommodate a grasping force applied by portions of a human hand. This permits convenient manipulation and handling of the filter element 52, particularly during servicing or changeout.

In preferred systems, the handle member 70 is secured to the element 52, such that a pulling force applied to the handle member 70 will translate into a pulling force applied to the filter element 52. In most preferred systems, the handle member 70 will be secured to a central core member 230 (FIG. 2), such that portions of the fluted construction 122 will not need to have obstructions or other connections made to accommodate the handle member 70.

The handle member 70 is preferably integral with the core member 230. Further, in the preferred embodiment shown in FIG. 2, the handle member 70 is molded as a single piece with the core 230. This single piece molding permits expedient, convenient manufacturing and assembly.

Figure 8:
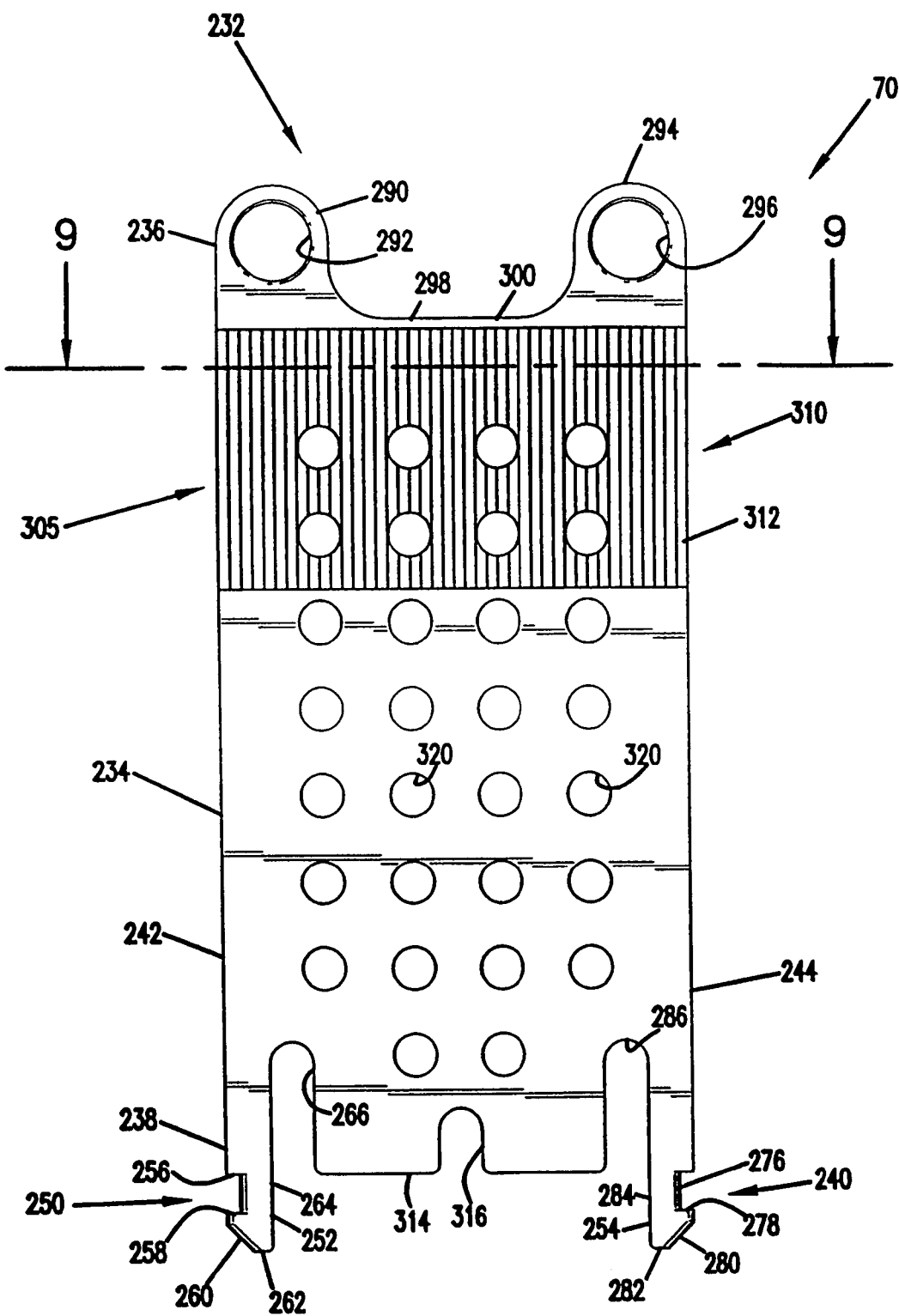
FIG. 8 is a top plan view of one embodiment of a center board usable in the filter elements depicted in FIGS. 2, 3, and 5-7.

In preferred embodiments, the handle member 70 will comprise a center board 232 (FIG. 8) for use in the filter element 52. Attention is directed to FIG. 8. One preferred center board 232 is illustrated, in top plan view. The center board 232 depicted comprises an extension 234 having a first end 236 and an opposite, second end 238. The handle member 70 forms the first end 236, in the preferred embodiment shown. A fastening member 240 forms the second end 238. As briefly discussed above, the fastening member 240 is constructed and arranged to connect to the frame 180.

By having the fastening member 240 engage and be secured to the frame 180, the filter element 52 can be removed from the housing 51 by grasping handle member 70, and without having the coiled fluted construction 122 forming the filter media of the element 52 be "telescoped." In other words, by securing the handle member 70 to the frame 180, and in particular to the support system 205, when pulling forces are used on the handle member 70, the element 52 is prevented from being pulled out in a telescoping manner. That is, because of the engagement between the fastening member 240 and the support system 205, each of the inlet face 60 and outlet face 62 maintain a relatively flat, planar surface. The engagement between the fastening member 240 and the struts 218 in the truss system 226 help to distribute the pulling force exerted on the handle member 70 throughout the entire cross-section of the filter element 52. The pulling force on the first end 64 of the element 52 is translated into a pulling force on the opposite, second end 66 of the element 52, and axially across the cross-section of the second end 66 of the element 52.

Still in reference to FIG. 8, the center board 232 preferably includes first and second side edges 242, 244 extending between the first and second ends 236, 238.

While a variety of embodiments for fastening members 240 are possible and contemplated herein, in the particular embodiment illustrated in FIG. 8, the fastening member 240 includes a hook construction 250. The hook construction 250 is for catching portions of the braces 214 of the support system 205. In the example illustrated in FIG. 8, the hook construction 250 includes a first hook 252 cantilevered from the extension 234 and being along the first side edge 242, and a second hook 254 cantilevered from the extension 234 and being along the second side edge 244.

The first hook includes a recessed region 256 that forms a seat, and a cornered shoulder 258. A surface 260 is angled from the shoulder 258 to reach an end point 262. Extending from the end point 262 is preferably an edge 264 that extends inwardly, to define a cutout 266. In the embodiment shown, the cutout 266 is U-shaped. The cutout 266 permits the first hook 252 to deflect in a direction toward the second side edge 244. The angled surface 260 abuts and slides along the braces 214, to allow for the deflection of the first hook 252, until the brace 214 engages within the recessed region 256.

It should be appreciated that the deflection permitted by the cutout 266 allows for convenient, quick engagement and connection between the center board 232 and frame 180. In particular, the first hook 252 deflects in a direction toward the second side edge 244, which allows one of the braces 214 to be seated within the recessed region 256 and be trapped by the cornered shoulder 258. Preferably, the deflection is at least 1 mm, no greater than about 20 mm, and typically about 1.5-5 mm.

The second hook 254 is constructed analogously as the first hook 254. As such, the second hook 254 includes a recessed region 276 as a seat for holding the braces 214. The second hook 254 includes a cornered shoulder 278, an angled surface 280, an end point 282, an edge 284, and a U-shaped cutout 286.

FIG. 7 shows the element 52 before the fastening member 240 has been snapped or hooked into place with the support system 205 of the frame 180. The filter element 52 is lowered into the frame 180, and the first and second hooks 252, 254 are deflected inwardly or toward each other, until the recessed regions 256, 276 of the hooks 252, 254 are snapped or engaged into the braces 214.

Referring again to FIG. 8, the handle member 70 is now described in further detail. Handle member 70 preferably includes at least one projection 290 axially extending from the first end 64 of the filter element 52 (FIG. 2). Attention is directed to FIG. 2. As can be seen in FIG. 2, the first projection 290 is oriented closer to the first side edge 242 than to the second side edge 244. In the particular preferred embodiment illustrated, the first projection 290 is even with the first side edge 242. The first projection 290 preferably has an aperture 292 extending therethrough to accommodate portions of a human hand, such as a few fingers.

There is also preferably a second projection 294 extending axially from the first end 64 of the filter element 52. The second projection 294 is preferably spaced apart from the projection 290 by distance 100 (FIG. 2) in order to accommodate the extension 90 from the cover 82 of the housing 51. The projection 294 preferably includes an aperture 296 extending therethrough sized to accommodate portions of a human hand, such as a few fingers. It can be seen that the second projection 294 is closer to the second side edge 244 than it is to the first side edge 242. In the preferred embodiment illustrated, the second projection 294 is even with the second side edge 244.

The center board 232 defines a recessed portion 298 (FIG. 8) extending between the first projection 290 and second projection 294. The second projection 294 is preferably located between the first projection 290 and the second side edge 244; similarly, the first projection 290 is preferably located between the second projection 294 and the first side edge 234. The preferred embodiment includes the recessed portion 298 extending between the first projection 290 and the second projection 294.

Preferably, the recessed portion 298 has a rigid, straight edge 300 extending between and connecting the first and second projections 290, 294. The edge 300 is used to engage and receive the projection 88 from the cover 82 (FIG. 2). In normal use, there is no engagement between the projection 88 and the edge 300. If there is engagement, it may indicate to the user that the element 52 is not properly installed in the housing 51. Engagement between the extension 90 and edge 300 will prevent securing the cover 82 to the body member 80. During use, there can be some engagement, if the element 52 vibrates in the body member 80. In those instances, the extension 90 will help to hold the element 52 in a properly installed position (with the radial seal 76 in place). The extension 90 is properly oriented in the void 100 created by the recessed portion 298.

Referring again to FIG. 8, there is preferably a system 305 for helping to hold the fluting sheet 130 in place, to prevent slippage and bowing outwardly, during assembly. In the illustrated embodiment, this system 305 is integral with the center board 232. In particular, the center board 232 includes a region of corrugations 310 located on the extension 234 between the first and second ends 236, 238. The region of corrugation 310 is preferably constructed and arranged to mate with flutes 124 of the fluted sheet 130, during construction and assembly of the filter element 52. When initially assembling the filter element 52, the fluted sheet 130 is wound around the center board 232. In some applications, the fluted sheet 130 will have a memory built in, and inherently will want to bow outwardly, radially in a direction away from the center board 232. It becomes difficult to create a secure, tight seal, when this is occurring. To rectify this, the region of corrugations 310 is in the center board 232, because the fluted sheet 130 is better able to mate and engage with the center board 232, than with a flat surface.

Figure 9:
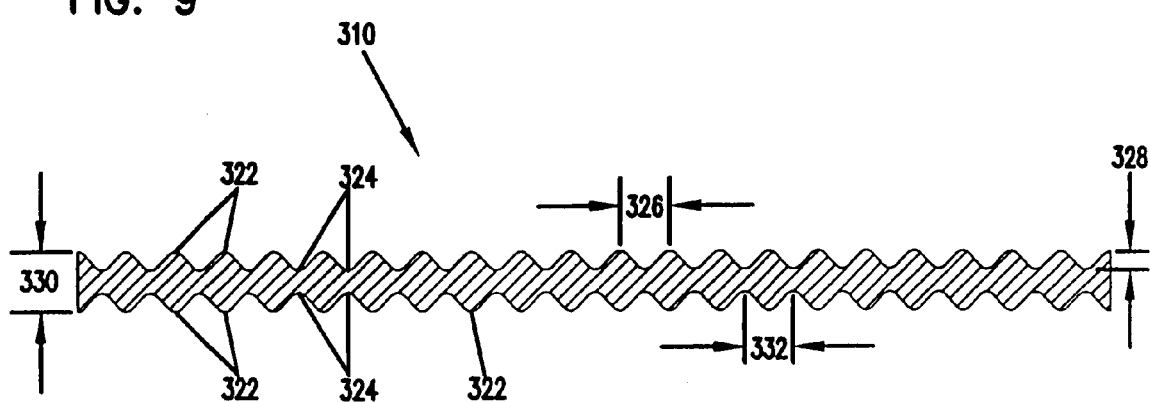
FIG. 9 is an enlarged cross-sectional view of the center board of FIG. 8, and taken along the line 9-9 of FIG. 8.

In reference now to FIG. 9, the region of corrugation 310 preferably includes a plurality of corrugations 312. In particular, the plurality of corrugations includes a plurality of peaks 322 alternating with a plurality of troughs 324. In the embodiment illustrated in FIG. 8, the corrugations 312 extend continuously between the first edge 242 and the second edge 244. In preferred embodiments, there will be at least 5 peaks 322 and 5 troughs 324; no more than about 100 peaks 322 and no more than about 100 troughs 324; and preferably between 10-50 peaks 322 and about 10-50 troughs 324. The corrugations 312 also help to prevent slippage of the fluted sheet 130 relative to the center board 232, during winding. In other words, the region of corrugation 310 provides a bearing surface to help hold and secure the fluted sheet 130 to the center board 232 during winding and manufacturing.

Note that in the embodiment of FIG. 8, the region of corrugations 310 extends only partially along the length of the extension 234. Preferably, the length of the region or corrugations 310 will extend at least 1 inch downwardly from the edge 300. In other embodiments, the region of corrugations 310 can extend the entire length between the edge 300 and an opposite edge 314 at the second end 238. Some minimal length of the corrugations 310 is desired because the adhesive securing the fluted sheet 130 and the center board 232 will extend only a partial distance along the center board 232. But, the region of corrugations 310 can also extend the entire length between the edge 300 and edge 314, because the corrugations 312 provide a bearing surface for winding the fluted sheet 130 around the center board 232.

During construction of the filter element 52, the center board 232 may be placed on a spindle and held at cutout 316. Adhesive is placed along the region of corrugations 310, and the fluted sheet 130 is placed over the adhesive. The flutes 124 mate with the individual corrugations 312 of the center board 232. The center board 232 is then turned about a central axis, while the fluted construction 122 is formed around the center board 232.

The individual corrugations 312 can be a variety of sizes. Preferred corrugations 312 will be of a size to mate with the individual flutes in the fluted sheet 130. One size includes: a peak to peak width 326 of about 5-7 mm, for example, about 6.5 mm; a trough to peak height 328 of about 1-4 mm, for example, about 2.5 mm; a radius on each peak 322 of about 0.5-2 mm, for example, about 1 mm; a radius on each trough 324 of about 1-3 mm, for example, about 1.3 mm; a peak to peak depth 330 of about 6-10 mm, for example, about 7.9 mm; and a trough to trough width 332 of about 5-8 mm, for example, about 6 mm.

Another size includes: a peak to peak width 326 of about 6-10 mm, for example, about 8.4 mm; a trough to peak height 328 of about 2-6 mm, for example, about 4.3 mm; and a trough to trough width 332 of about 6-10 mm, for example, about 8.4 mm.

Another size includes: a peak to peak width 326 of at least 5 mm, no greater than 9 mm—for example, about 7.6 mm; a trough to peak height 328 of at least 2 mm, no greater than 5 mm—for example, about 3.3 mm; a peak to peak depth 330 of at least 1 mm, no greater than 6 mm—for example, about 3.3 mm; and a trough to trough width 332 of at least 4 mm, no greater than 10 mm—for example, about 7.6 mm.

Referring again to FIG. 8, the preferred center board 232 includes a plurality of apertures or holes 320. The holes 320 help to create a lightweight center board 232. The holes 320 can be in any pattern.

G. Methods of Operating, Servicing, and Assembling

In operation, gas to be cleaned, such as airflow being taken into equipment 22, will be initially sucked into the air cleaner 50 and directed through inlet 56. The air will then flow through the inlet face 60 of the filter element 52. The air will enter the flute chambers 136 that are opened at the upstream end 64. The air will be forced to flow through either the fluting sheet 130 or the face sheet 132, and as such, have particulates removed therefrom. The cleaned air will then exit at the outlet face 62. That is, the cleaned air will exit through the flutes 134 that are open at the second end 66. The cleaned air will then flow through the outlet 58, and be directed to downstream components, such as engine 24. The uncleaned air is prevented from bypassing the filter element 52 by the radial seal 76 between the filter element 52 and the housing 80.

After a certain period of operation, the air cleaner 50 will require servicing. The filter element 52 will become occluded and require replacing. Typically, the filter element 52 should be removed and replaced when the restriction reaches at least 25 inches of water. To service the air cleaner 50, the cover 82 is removed from the body member 80. This is done by removing the bolts 86 and then removing the cover from the body member 80 to expose the opening 84. This provides access to the interior 54 of the body member 80. When the cover 82 is removed from the body member 80, the element engaging end 96 of the extension 90 is removed from the void 100 of the recessed portion 298 of the handle member 70.

Next, the user grasps the filter element 52. Preferably, this is done by grabbing the handle member 70. In the preferred embodiment, this is done by inserting at least one finger of one hand in the aperture 292, and another finger of the other hand in aperture 296. The user then applies a pulling force to the handle member 70. This translates into a pulling force on the extension 234, and ultimately onto the frame construction 72. That is, the pulling force is transferred through the fastening member 240 to the support system 205. The pulling force will move the filter element 52 in an axial direction, such that the seal member 74 moves from the second annular region 104 to the first annular region 102. This breaks the radial seal 76.

The filter element 52 is then removed through the opening 84 outside of the air cleaner 50. The old filter element 52 may then be disposed of. This may be accomplished by incinerating the entire filter element 52, including the center board 232. Alternatively, the fluted media construction 122 may be separated from the center board 232, such that the center board 232 may be reused. Or, alternatively, after the fluted construction 122 is removed from the center board 232, each can be disposed of in separate recycling programs.

A second, new, filter element 52 is then supplied. The new filter element 52 is inserted through the opening 84 of the body member 80. The user may manipulate the filter element 52 by grasping the handle member 70, through its projections 290, 294. The filter element 52 is inserted into the housing 51, until the radial seal 76 is formed. In the illustrated embodiment, this is done by pushing the filter element 52 into the body member 80, until the end 196 of the seal member 74 abuts or engages the end wall 108 of the second annular region 104.

The cover 82 is then oriented over the open end 84. As this is done, the extension 90 is lowered into the interior 54. If the filter element 52 has not been properly seated within the seat of the annular region 104, the extension 90 will engage the edge 300 of the handle member 70 and prevent the cover 82 from being properly seated on the body member 80. If the filter element 52 is properly seated within the seat of the annular region 104 (and the radial seal 76 is in place), then the cover 82 will be permitted to properly fit onto the body member 80. The extension 90 will rest in the void 100. The cover 82 is then secured to the body member 80, by tightening the bolts 86. The air cleaner 50 is then ready to be operated again.

To construct preferred filter elements 52 as described herein, first, the center board 232 is provided. The center board 232 may be made using conventional techniques, such as injecting molding.

Next, adhesive is applied to the region of corrugations 310. In the preferred embodiment of FIG. 8, adhesive is applied only to a portion of the region of corrugations 310. In particular, adhesive is applied only along about the upper one-third of the region of corrugations 310, completely between edge 242 and edge 244. By "upper portion," it is meant the portion that is closer to the handle member 70 than to the fastening member 240. In other embodiments, the adhesive can be along the entire length of the region of corrugations 310, or less than the upper one-third, for example, the upper 10-25%.

It should be noted that adhesive is applied on both top and bottom sides of the region of corrugation 310 of the center board 232.

The fluting sheet 130 is then laid over the center board 232. Individual flutes of the fluting sheet 130 are mateably engaged with individual corrugations 312 of the region of corrugation 310. The adhesive joins the fluting sheet 130 to the extension 234. The fluting sheet 130 is wrapped around the center board 232 completely. In other words, the first layer of the fluting sheet 130 will completely circumscribe both the top and bottom side of the center board 232. The region of corrugations 310 will help to keep the fluting sheet 130 tightly against the center board 232. The region of corrugations 310 will also provide a bearing surface to help wind the fluted construction 122 therearound.

Preferably, the center board 232 is held at notch 316 by the spindle of a machine. The machine spindle will turn the center board 232 about its central longitudinal axis, to wind the fluting sheet 130 and face sheet 132 around the center board 232.

After the fluted construction 122 is wound around the center board 232, the center board 232 is secured to the frame construction 72. In preferred embodiments described herein, the fastening member 240 is connected or secured to the braces 214 of the support system 205. This is done by lowering the center board 232 with the media construction 122 secured thereto into the frame 180. The angled surfaces 260, 280 will cam or be pushed against the braces 214. The cutouts 266, 286 will allow the hooks 252, 254 to deflect inwardly, toward each other. The cornered shoulders 258, 278 will then snap over the braces 214. This will trap the braces 214 into the recesses 256, 276. Typically, before the centerboard 232 is connected to the frame 180, adhesive will be applied along the inner surface of the lip 182, to secure the outer layer 170 to the lip 182 of the frame 180. The filter element 52 may then be installed in the air cleaner housing 51.

H. Example Materials and Dimensions

The following section includes usable materials and dimensions of specific embodiments. Of course, a wide variety of materials and dimensions may be utilized.

Preferably, the housing 51 is constructed of plastic, for example glass filled nylon. The extension 90 will have a length of at least about 50 mm, and no greater than about 500 mm. The extension 90 will have a width 98 of at least about 5 mm, no greater than about 50 mm, and typically about 10-40 mm. As a percentage of the distance 100, the width 98 of the extension 90 will be at least about 10%, no greater than 95%, and typically about 25-75% of the distance 100.

The filter element 52 will have an overall length extending between its inlet face 60 and outlet face 62 of at least about 100 mm, no greater than about 500 mm, and typically about 200-300 mm. It will have a major dimensional width of at least about 100 mm, no greater than about 400 mm, and typically about 200-300 mm. It will have a minor dimensional width of at least about 25 mm, no greater than about 250 mm, and typically about 50-150 mm.

The filter element 52 can be constructed of cellulose. One example of usable cellulose media is: a basis weight of about 45-55 lbs./3000 ft$^2$ (84.7 g/m$^2$), for example, 48-54 lbs./3000 ft$^2$; a thickness of about 0.005-0.015 in, for example about 0.010 in. (0.25 mm); frazier permeability of about 20-25 ft/min, for example, about 22 ft/min (6.7 m/min); pore size of about 55-65 microns, for example, about 62 microns; wet tensile strength of at least about 7 lbs/in, for example, 8.5 lbs./in (3.9 kg/in); burst strength wet off of the machine of about 15-25 psi, for example, about 23 psi (159 kPa). The cellulose media can be treated with fine fiber, for example, fibers having a size (diameter) of 5 microns or less, and in some instances, submicron. A variety of methods can be utilized for application of the fine fiber to the media. Some such approaches are characterized, for example, in U.S. Pat. No. 5,423,892, column 32, at lines 48-60. More specifically, such methods are described in U.S. Pat. Nos. 3,878,014; 3,676,242; 3,841,953; and 3,849,241, incorporated herein by reference. An alternative is a trade secret approach comprising a fine polymeric fiber web positioned over conventional media, practiced under trade secret by Donaldson Company under the designation ULTRA-WEB®. With respect to the configurations of the filter element, there is no particular preference for: how the fine fibers are made; and, what particular method is used to apply the fine fibers. Enough fine fiber would be applied until the resulting media construction would have the following properties: initial efficiency of 99.5% average, with no individual test below 90%, tested according to SAE J726C, using SAE fine dust; and an overall efficiency of 99.98% average, according to SAE J726C.

The center board 232 will have an overall length of at least about 100 mm, no greater than about 800 mm, and typically about 200-500 mm. It will have an overall width between side edge 242 and side edge 244 of at least about 50 mm, no greater than about 500 mm, and typically about 100-200 mm. Each of the projections 290, 294 will extend above the first end 64 by a distance of at least about 20 mm, no greater than about 200 mm, and typically about 40-100 mm. The distance 100 between the inside edges of the projections 290, 294 is at least about 25 mm, no greater than about 300 mm, and typically about 50-150 mm. Each of the apertures 292 will have an outermost dimension (preferably, a diameter) of at least about 10 mm, no greater than about 150 mm, and typically about 20-70 mm.

The length of the region of corrugations 310 will preferably be at least about 20 mm, no greater than about 200 mm, and typically about 50-100 mm. There will preferably be at least 5, no greater than about 100, and typically about 10-30 individual corrugations 312.

Each of the angled surfaces 260, 280 on the hooks 252, 254 will extend at an angle relative to the central longitudinal axis of the center board 232 of at least about 30°, no greater than about 60°, and typically about 40-50°. Each of the recesses 256, 276 will have a width of at least about 4 mm, no greater than about 25 mm, and typically about 5-15 mm. Each of the cutouts 266, 286 will extend at least about 10 mm, no greater than about 80 mm, and typically about 20-50 mm from the bottom edge 314.

The center board 232 will have an overall thickness of at least about 1 mm, no greater than about 20 mm, and typically about 2-10 mm. The center board 232 will have an overall weight of at least about 2 oz., no greater than about 10 oz., and typically about 4-6 oz. There will be at least 1 hole 320, no greater than about 100 holes 320, and typically about 25-35 holes 320. Preferably, the center board 232 will be constructed of plastic, such as glass filed nylon, preferably 13% glass filled nylon.

Preferably, the frame 180 will be constructed from plastic, such as 33% glass filled nylon. The seal member 74 can be constructed from foamed polyurethane having an as molded density of about 11-22 lbs/ft$^3$. One usable foamed polyurethane is described in U.S. Pat. No. 5,669,949, incorporated herein by reference.

The above specification, examples, and data provide a complete description of the manufacture and use of the invention. Many embodiments of the invention can be made.

We claim:

1. A removable and replaceable air filter element for use in an air cleaner; the filter element comprising:
   (a) a center board including an extension having: first and second, opposite ends; and first and second side edges extending between the first and second ends;
   (b) filter media oriented around, and secured to, the center board;
      (i) the filter media being configured for straight through flow and comprising a first fluted filter sheet secured to a second filter sheet and coiled around the center board into a coiled media construction having: an inlet face; an opposite outlet face; and, a plurality of flutes extending between the inlet and outlet faces; each of the flutes having a first end portion and a second end portion; selected ones of the flutes comprising inlet flutes open at an end portion adjacent the inlet face and closed at an end portion adjacent the outlet face; and selected ones of said flutes being outlet flutes closed at an end portion adjacent the inlet face and open at an end portion adjacent the outlet face;
      (ii) the filter media and center board forming a filter element having a non-circular cross-section with opposite rounded ends; and
      (iii) the filter element being closed to passage of unfiltered air therethrough, without filtering passage through the media;
   (c) a seal member positioned at a location for forming a seal between the filter element and an air cleaner housing, in use;
   (d) a frame construction comprising an annular sealing support for compressing the seal member with an air cleaner housing, the frame construction being constructed for engagement with the center board; and
   (e) a handle member secured to the center board and the frame construction such that a pulling force applied to the handle member translates to a pulling force applied to the filter element.

2. A removable and replaceable air filter element according to claim 1 wherein:
   (a) said handle member comprises at least a single aperture therethrough.

3. A removable and replaceable air filter element according to claim 1 wherein:
   (a) the center board comprise-s glass filled nylon; and
   (b) the center hoard has a weight of at least 2 oz.

4. A removable and replaceable air filler element according to claim 1 wherein:
   (a) the seal member is oriented to form an annular radial seal.

5. An air cleaner comprising:
   (a) a housing having a body member defining an interior and an open end;
   (b) a filter element removeably positioned in said interior; the filter element comprising:
      (i) a center hoard including: an extension having first and second, opposite ends; and first and second side edges extending between the first and second ends;
      (ii) filter media oriented around, and secured to, the center board;
         (A) the filter media being configured for straight through flow and comprising a first fluted filter sheet secured to a second filter sheet and coiled around the center board into a coiled media construction having: an inlet face; an opposite outlet race; and, a plurality of flutes extending between the inlet and outlet faces; each of the flutes having a first end portion and a second end portion; selected ones of the flutes comprising inlet flutes open at an end portion adjacent the inlet face and closed at an end portion adjacent the outlet face; and selected ones of said flutes being outlet flutes closed at an end portion adjacent the inlet face and open at an end portion adjacent the outlet face;
         (B) the filter media and center board forming a filter element having a non-circular cross-section with opposite rounded ends; and,
         (C) the filter element being closed to passage of unfiltered air therethrough, without filtering passage through the media; and,
      (iii) a seal member positioned at a location for forming a seal between the filter element and the air cleaner housing, in use;
      (iv) a frame construction comprising an annular scaling support for compressing the seal member with an air cleaner housing, the frame construction being constructed for engagement with the center board; and
      (v) a handle member secured to the center board and the frame construction such that a pulling force applied to the handle member translates to a pulling force applied to the filter element.

6. An air cleaner according to claim 5 wherein:
   (a) said handle member comprises at least a single aperture therethrough.

7. An air cleaner according to claim 5 wherein:
   (a) the center board comprises glass filled nylon; and
   (b) the center hoard has a weight of at least 2 oz.

8. An air cleaner according to claim 5 wherein:
   (a) the seal member is oriented to provide an annular radial seal against a portion of the housing.

9. A removeable and replaceable air filter element according to claim 1 wherein:
   (a) the center board includes a region of corrugations; said corrugations mateably engaging at least some of said flutes of said filter media.

10. A removeable and replaceable air filter element according to claim 1 wherein:
    (a) said frame construction includes a plurality of support braces extending at least partially over the inlet face of the filter media.

* * * * *